(12) United States Patent
Munro et al.

(10) Patent No.: US 6,896,903 B2
(45) Date of Patent: May 24, 2005

(54) BIOADHESIVE COMPOSITIONS (75) Inventors: Hugh Semple Munro, Chipping Camden (GB); Brian John Tighe, Birmingham (GB)

(73) Assignee: First Water Limited, Wiltshire (GB)

( * ) Notice: Subject to any disclaimer, the term of this patent is extended or adjusted under 35 U.S.C. 154(b) by 92 days.

(21) Appl. No.: 09/916,880

(22) Filed: Jul. 27, 2001

(65) Prior Publication Data

US 2002/0015689 A1 Feb. 7, 2002

Related U.S. Application Data (63) Continuation of application No. PCT/GB00/00302, filed on Feb. 2, 2000.

(30) Foreign Application Priority Data

Feb. 2, 1999 (EP) .............................................. 99300740

(51) Int. Cl.⁷ ................................................ A61K 9/14
(52) U.S. Cl. ........................ 424/486; 424/487; 424/484; 424/78.08; 424/78.06; 424/445; 424/443
(58) Field of Search ................................ 424/443, 445, 424/446, 447, 488, 449, 450, 78.02, 78.03, 78.06, 78.08, 78.17, 484, 486, 487

(56) References Cited

U.S. PATENT DOCUMENTS 5,993,840 A * 11/1999 Fawkes et al. ............... 424/404

FOREIGN PATENT DOCUMENTS

| EP | 0 012 402 | 6/1980 |
| EP | 0 188 381 | 7/1986 |
| WO | WO 81/02097 | 8/1981 |
| WO | WO 95/20634 | 8/1995 |
| WO | WO 97/05171 | 2/1997 |

OTHER PUBLICATIONS

*European Search Report* corresponding to Great Britain Patent Application Serial No. 99300740.0, European Patent Office, dated Aug. 20, 1999, 3 pages.
*International Search Report* corresponding to International Patent Application Serial No. PCT/GB00/00302, European Patent Office, dated May 24, 2000, 4 pages.
*International Preliminary Examination Report* corresponding to International Patent Application Serial No. PCT/GB00/00302, European Patent Office, dated Mar. 23, 2001, 5 pages.

* cited by examiner

*Primary Examiner*—Thurman K. Page
*Assistant Examiner*—Liliana Di Nola-Baron
(74) *Attorney, Agent, or Firm*—Welsh & Katz, Ltd.

(57) ABSTRACT

A bioadhesive composition formed by polymerizing a homogeneous aqueous reaction mixture comprising from about 5% to about 50%, by weight of the reaction mixture, of at least one ionic water soluble monomer, from about 10% to about 50%, by weight of the reaction mixture, of at least one plasticizer (other than water), up to about 50%, by weight of the reaction mixture, of at least one non ionic water soluble monomer, up to about 40%, by weight of the reaction mixture, of water, optionally as well as up to about 10%, by weight of the reaction mixture, of at least one surfactant and from about 1% to about 30%, by weight of the reaction mixture, of at least one hydrophobic monomer and/or polymer. An electrolyte may be present, to enhance electrical conductivity, e.g. for use in biomedical electrodes.

28 Claims, 1 Drawing Sheet

BIOADHESIVE COMPOSITIONS

RELATED APPLICATION

This application is a continuation of International Patent Application Serial Number PCT/GB00/00302, filed Feb. 2, 2000.

FIELD OF THE INVENTION

The present invention relates to bioadhesive compositions. One possible application of the compositions of the invention is in the field of biomedical skin electrodes. These electrodes incorporate bioadhesive compositions which are electrically conductive.

BACKGROUND OF THE INVENTION

Biomedical skin electrodes are widely used in a variety of situations, whenever for example it is required to establish an electrical connection between the surface of the body of a patient and external medical equipment for transmission of electrical signals.

Modern medicine uses many medical procedures where electrical signals or currents are received from or delivered to a patient's body. The interface between medical equipment used in these procedures and the skin of the patient is usually some sort of biomedical electrode. Such electrodes typically include a conductor which must be connected electrically to the equipment, and a conductive medium adhered to or otherwise contacting skin of the patient, and they are of varying types with a wide variety of design configurations which will generally depend on their intended use and whether for example they are to be used as transmission electrodes or sensing i.e. monitoring electrodes.

Among the therapeutic procedures using biomedical electrodes are transcutaneous electric nerve stimulation (TENS) devices used for pain management; neuromuscular stimulation (NMS) used for treating conditions such as scoliosis; defibrillation electrodes to dispense electrical energy to a chest cavity of a mammalian patient to defibrillate heart beats of the patient; and dispersive electrodes to receive electrical energy dispensed into an incision made during electrosurgery.

Among diagnostic procedures using biomedical electrodes are monitors of electrical output from body functions, such as electrocardiograms (ECG) for monitoring heart activity and for diagnosing heart abnormalities.

For each diagnostic, therapeutic, or electrosurgical procedure, at least one biomedical electrode having an ionically conductive medium containing an electrolyte is adhered to or is otherwise contacted with mammalian skin at a location of interest and is also electrically connected to electrical diagnostic, therapeutic, or electrosurgical equipment. A critical component of the biomedical electrode is the conductive medium which serves as the interface between the mammalian skin and the diagnostic, therapeutic, or electrosurgical equipment, and which is usually an ionically conductive medium.

Biomedical electrodes are used among other purposes to monitor and diagnose a patient's cardiovascular activity. Diagnostic electrodes are used to monitor the patient immediately and are only applied to the patient for about five to ten minutes. Monitoring electrodes, however, are used on patients in intensive care for up to three days continuously. In contrast, Holter electrodes are used to monitor a patient during strenuous and daily activities.

Although all of the biomedical electrodes just referred to are used to record cardiovascular activity, each electrode requires specific features or characteristics to be successful. Thus, the diagnostic electrode does not have to remain adhered to a patient for extensive periods but it does have to adhere to hairy, oily, dry and wet skin effectively for the five to ten minutes of use. The monitoring electrode has to adhere for a longer period of time although the patient is often immobile during the monitoring period. The Holter electrodes is susceptible to disruption from adhesion due to physical motion, perspiration, water, etc., and therefore requires the best adhesion and at the same time comfort and electrical performance.

In the biomedical electrodes known in the prior art the ionically conductive medium which serves as an interface, between the skin of a mammalian patient and the electrical instrumentation, ranges from conductive gels and creams to conductive pressure sensitive adhesives. However, while the conductive media can be in the form of pressure sensitive conductive adhesives, for monitoring or Holter biomedical electrodes the use of such conductive adhesives is not generally adequate on their own to maintain adhesion to mammalian skin and additional hypoallergenic and hydrophobic pressure sensitive adhesives may be employed around the conductive medium to provide the required mammalian skin adhesion. U.S. Pat. No. 5,012,810 (Strand et al.) and U.S. Pat. Nos. 4,527,087, 4,539,996, 4,554,924 and 4,848,353 (all Engel), the disclosures of which are incorporated herein by reference, are examples of documents that disclose biomedical electrodes which have a hydrophobic pressure sensitive adhesive surrounding the conductive medium.

In general, a desirable skin electrode is one which maintains good electrical contact with the skin and is free of localized current hot spots, i.e. exhibits uniform conductivity. For example, it has been found that a prior art electrode utilizing karaya-gum tends to creep in use and flatten out, exposing skin to possible direct contact with the current distribution member or lead wire. A desirable skin electrode should also usually have a low electrical impedance.

WO-A-95/20634 (3M), the disclosure of which is incorporated herein by reference, describes a bicontinuous pressure sensitive adhesive having a continuous phase of a hydrophobic pressure sensitive adhesive polymer and a continuous phase of a hydrophilic polymer, the adhesive being stated as having utility in biomedical electrodes, mammalian skin coverings and pharmaceutical delivery devices.

WO-A-97/05171 (3M), the disclosure of which is incorporated herein by reference, describes a bicontinuous pressure sensitive adhesive having a continuous phase of a hydrophobic pressure sensitive adhesive polymer and a continuous phase of a hydrophilic polymer, the adhesive having peel adhesion of at least 3 Newtons per 100 mm as measured according to a PSTC-1 Test as defined in the disclosure, the adhesive again being stated as having utility in biomedical electrodes, mammalian skin coverings and pharmaceutical delivery devices.

The adhesives of the above 3M publications are prepared by polymerization of a microemulsion of hydrophobic and hydrophilic monomers, the microemulsion having oil and aqueous phases in which the respective hydrophobic and hydrophilic monomers reside prior to polymerization, optionally with further components such as certain stated surfactants, water soluble additives, other polar monomers etc. In their respective Examples 38, for instance, both 3M publications describe a pressure sensitive adhesive formed from a polymerized microemulsion containing water, hydrophobic monomer (isooctyl acrylate), hydrophilic monomer (2-acrylamido-2-methylpropane sulphonic acid), a hydrophilic reactive oligomer (AM90G ester, which is a polyethylene oxide acrylate), surfactant (SAM 211) to construct the microemulsion, and N-vinyl pyrrolidone (which is a further reactive polar monomer in addition to the hydrophilic monomer), together with a photoinitiator. On suitable irradiation of the microemulsion, the polymerized bicontinuous adhesive is stated to be formed.

WO-A-97/24149 (3M), the disclosure of which is incorporated herein by reference, describes a lipophilic polar pressure sensitive adhesive stated to have enhanced adhesion to greasy skin, the adhesive including a hydrophilic polymer matrix, a polar organic plasticiser and at least 9 wt % of a surfactant having an HLB (hydrophile lipophile balance) value of 10 to 17. It is stated generally that the hydrophilic polymer matrix may be selected from a range of polymers including homo- and copolymers of, for example, (meth)acrylic acid and salts thereof, acrylamide, -vinyl pyrrolidone and acrylamidopropane sulphonic acid and salts thereof. The adhesive is prepared by polymerization in a homogeneous aqueous mixture.

The adhesive disclosed in WO-A-97/24149 is stated to have utility in biomedical electrodes, mammalian skin coverings and pharmaceutical delivery devices. However, only acrylic acid homopolymer and N-vinyl pyrrolidone homopolymer based adhesives are specifically exemplified in the working Examples. The presence of a hydrophobic monomer and/or polymer is not described.

U.S. Pat. No. 5,338,490 (Dietz et al), the disclosure of which is incorporated herein by reference, describes a two-phase composite pressure sensitive adhesive having discontinuous hydrophobic pressure sensitive adhesive domains within a continuous hydrophilic phase. The adhesive is stated to be ionically conductive regardless of the amount of water present, whereby the adhesive is stated to have utility in biomedical electrodes. This ionic conductivity is achieved by the use, as the hydrophilic phase, of an ionic salt dissolved in a solvating polymer generally selected from the group consisting of crosslinked poly(N-vinyl lactam), crosslinked polyacrylamide and its ionic forms, crosslinked polyacrylic acid and its salts, crosslinked poly-(2-acrylamido-2-methylpropane sulphonic acid), its salts, crosslinked copolymers of the acid, crosslinked copolymers of salts of the acid, or mixtures or combinations thereof. The discontinuous hydrophobic domains are formed of hydrophobic materials generally selected from polyacrylates, polyolefins, silicone adhesives, natural or synthetically derived rubber base adhesives, polyvinyl ethers and blends thereof. The adhesive is stated to be prepared by preforming the hydrophobic and hydrophilic components and codissolving them in a solvent, which is then removed by boiling off to leave the adhesive.

The prior art adhesives suffer from a number of disadvantages, whether under performance, manufacturing, economic, environmental or safety considerations, or any combination thereof.

SUMMARY OF THE INVENTION

It is an object of this invention to provide hydrogel skin adhesives possessing controlled and predictable adhesive properties which may be readily varied to suit different uses and, in the case of medical electrodes or similar devices, different configurations or applications.

In particular, individual aspects of the invention seek, respectively, to provide hydrogel skin adhesives which provide good adhesion to moist and wet skin and such adhesives for use in biomedical skin electrodes. These hydrogels would be useful for adhesion to skin which is subject to flushing by water or aqueous solutions. Conventional bioadhesives generally provide poor adhesion to wet skin.

Further aspects of the present invention seek, respectively, to provide hydrogel skin adhesives which provide good adhesion to grease-coated skin and such adhesives for use in biomedical skin electrodes. Such hydrogel adhesives would ideally provide good adhesion to various skin types, taking account, for example, of the various skin types of people of different ethnic origin which tend to have secreted thereon varying amounts and differing types of grease. Such hydrogels would also ideally provide good adhesion to skin to which an artificial layer of grease has been applied, for example from moisturizing skin creams.

According to a first aspect of the present invention there is provided a bioadhesive composition formed by polymerizing a homogeneous aqueous reaction mixture comprising from about 5% to about 50%, by weight of the reaction mixture, of at least one ionic water soluble monomer, from about 10% to about 50%, by weight of the reaction mixture, of at least one plasticiser (other than water), up to about 50% (e.g. from about 0.05% to about 50% and preferably from about 10% to about 50%), by weight of the reaction mixture, of at least one non ionic water soluble monomer and up to about 40% (e.g. from about 0.05% to about 40% and preferably from about 3% to about 40%), by weight of the reaction mixture, of water.

The compositions of the invention exhibit water stability. For the purposes of the present invention "water stability" is defined as the maintenance of adhesion to skin or another substrate from a level of 50% to more than 100% of the value of the "as made" hydrogel adhesive when the water content of the hydrogel has increased by absorption of water (from the environment external to the hydrogel). Moreover, the compositions exhibit a particularly advantageous combination of (a) adhesive strength on the skin, (b) resistance to loss of skin adhesion as the water content of the hydrogel increases by absorption of water, and (c) reduction in the rate of uptake of water, as compared to corresponding compositions known in the art.

According to a second aspect of the present invention there is provided a bioadhesive composition exhibiting water stability as defined herein, said composition being formed by polymerizing a homogeneous aqueous reaction mixture comprising at least one ionic water soluble monomer, at least one plasticiser (other than water) and at least one non ionic water soluble monomer.

Other aspects and embodiments of the present invention are defined and described below and in the appended claims.

DESCRIPTION OF THE PREFERRED EMBODIMENTS

The compositions of the invention exhibit surprisingly good adhesion to both dry and moist skin and on subsequent exposure to large amounts of water. In particular, the hydrogels in accordance with the invention generally provide adhesion on dry skin at no less than 0.5 N/cm.

The compositions of the invention are found to provide good two-stage adhesion with a good initial "first stage" adhesion on first contact of the hydrogel with the skin which adhesion increases with time in the "second stage."

Whilst providing sufficient adhesion it is noted that the hydrogel adhesives of the invention allow for pain free removal from the skin.

The term "homogeneous aqueous reaction mixture" used herein refers to a substantially solubilised system in which substantially no phase segregation occurs prior to the polymerization reaction. For example, an emulsion, microemulsion or phase-separated mixture in which a polymerization reaction later occurs is not a homogeneous aqueous reaction mixture as understood for the purpose of the present invention. Where a reaction mixture includes hydrophobic components, special measures will therefore be required, to achieve homogeneity, as described in more detail below.

Ionic Monomer

In a preferred embodiment of the invention the ionic monomer comprises an acrylate based monomer selected for its ability to polymerize rapidly in water. Most preferably the ionic monomer comprises at least one of 2-acrylamido-2-methylpropane sulphonic acid, an analogue thereof or one of its salts, for example, an alkali metal salt such as a sodium, potassium or lithium salt. The term "analogue" in this context refers particularly to substituted derivatives of 2-acrylamido-2-methylpropane sulphonic acid. A particularly preferred example of the ionic monomer is 2-acrylamido-2-methylpropane sulphonic acid sodium salt, commonly known as NaAMPS, available commercially at present from Lubrizol as either a 50% aqueous solution (reference code LZ2405) or a 58% aqueous solution (reference code LZ 2405A). The reaction mixture preferably comprises from about 10% to about 50%, and ideally from about 30% to about 50%, by weight of the reaction mixture, of the ionic monomer.

Plasticiser

In a preferred embodiment of the invention the plasticiser comprises any of the following either alone or in combination: at least one polyhydric alcohol (such as glycerol), at least one ester derived therefrom and/or at least one polymeric alcohol (such as polyethylene oxide). Glycerol is the preferred plasticiser. An alternative preferred plasticiser is the ester derived from boric acid and glycerol. The plasticiser is generally used to plasticise the hydrogel compositions in accordance with the invention and control adhesive and electrical properties, for electrically conducting hydrogels. When water is lost from the hydrogel both the adhesive and electrical properties may change deleteriously. The reaction mixture preferably comprises from about 15% to about 45%, by weight of the reaction mixture, of plasticiser (other than water).

Non ionic Monomer

In a preferred embodiment of the invention the aforesaid non ionic water soluble monomer will comprise at least one of a mono- or di-N-alkylacrylamide or an analogue thereof. The term "analogue" in this context refers to non ionic water soluble monomers containing an alkyl or substituted alkyl group linked to a carbon-carbon double bond via an amido or alkylamido (—CO.NH— or CO.NR—) function. Examples of such analogues include diacetone acrylamide (N-1,1-dimethyl-3-oxobutyl-acrylamide), N-alkylated acrylamides, N,N-dialkylated acrylamides, -vinyl pyrrolidone and acryloyl morpholine. N,N-dimethylacrylamide (NNDMA) and/or an analogue thereof is preferred. The reaction mixture preferably comprises from about 15% to about 30% and ideally from about 15% to about 25%, by weight of the reaction mixture, of the non ionic water soluble monomer.

Crosslinking and Polymerization

Conventional crosslinking agents are suitably used to provide the necessary mechanical stability and to control the adhesive properties of the hydrogel. Although hydrogels can be made with suitable adhesive and, when required electrical properties, a sufficient amount of a suitable cross-linker should also be used; if too little crosslinker is used, converting the material into a completed electrode becomes impossible. The amount of crosslinking agent required will be readily apparent to those skilled in the art such as from about 0.05% to about 0.2%, by weight of the reaction mixture. Typical crosslinkers include tripropylene glycol diacrylate, ethylene glycol dimethacrylate, triacrylate, polyethylene glycol diacrylate (PEG400 or PEG600), methylene bis acrylamide.

The adhesives with which this invention is concerned generally comprise, in addition to a crosslinked polymeric network, an aqueous plasticising medium and, optionally, at least one electrolyte, whilst the materials and processing methods used are normally chosen to provide a suitable balance of adhesive and electrical properties for the desired application. In particular, the type of water and its activity together with the rheological properties of the hydrogels will generally be controlled to produce a balance of pressure sensitive adhesive properties and, when required, electrical properties. One preferred feature of the process used in carrying out the invention is that to achieve the desired adhesive and electrical properties the final amount of water required in the hydrogel is present in the formulation prior to gellation, i.e. no water is removed from the hydrogel after manufacture and less than about 10% during manufacture.

The method of manufacture of the compositions of the invention would generally involve free radical polymerization and ideally would involve the to use of a photoinitiator or a combination of photoinitiation and thermal initiation. Preferably the reaction mixture comprises from about 0.02% to about 2%, and ideally from about 0.02% to about 0.2%, by weight of the reaction mixture of photoinitiator. Preferably the reaction mixture comprises from about 0.02% to about 2%, and ideally from about 0.02% to about 0.2%, by weight of thermal initiator. Preferred photoinitiators include any of the following either alone or in combination:

Type I-α-hydroxy-ketones and benzilidimethyl-ketals e.g. Irgacure 651. These are believed on irradiation to form benzoyl radicals that initiate polymerization. Photoinitiators of this type that are preferred are those that do not carry substituents in the para position of the aromatic ring. Examples include Irgacure 184 and Darocur 1173 as marketed by Ciba Chemicals, as well as combinations thereof.

Photoinitiators of the following general formula are preferred:

where $R_1$ can be any of the following:- hydrogen, $H_3C$—S—, $R_1$ is most preferably hydrogen.
$R_2$ can suitably be any of the following:-

$R_2$ is most preferably as follows:

A particularly preferred photoinitiator is 1-hydroxycyclohexylphenyl ketone; for example as marketed under the trade name Irgacure 184 by Ciba Speciality Chemicals. Also preferred are Darocur 1173 (2-hydroxy-2-propyl phenyl ketone) and mixtures of Irgacure 184 and Darocur 1173.

Applications

The adhesives described herein may be used in a range of skin contact applications either unsupported, or in the form of membranes, composites or laminates.

Such applications include tapes, bandages and dressings of general utility, wound healing and wound management devices; skin contacting, ostomy and related incontinence devices and the like. Other fields of application include pharmaceutical delivery devices, for the delivery of pharmaceuticals or other active agents to or through mammalian skin, optionally containing topical, transdermal or iontophoretic agents and excipients. Non-limiting examples of penetration-enhancing agents include methyl oleic acid, isopropyl myristate, Azone® Transcutol® and N-methyl pyrrolidone.

Biomedical Skin Electrodes

A particularly preferred application is in the field of biomedical skin electrodes.

According to a third aspect of the present invention there is provided the use of a bioadhesive composition in a biomedical skin electrode, said composition being formed by polymerizing a homogeneous aqueous reaction mixture comprising from about 5% to about 50%, by weight of the reaction mixture, of at least one ionic water soluble monomer, from about 10% to about 50%, by weight of the reaction mixture, of at least one plasticiser (other than water), up to about 50% (e.g. from about 0.05% to about 50% and preferably from about 10% to about 50%), by weight of the reaction mixture, of at least one non ionic water soluble monomer, up to about 40% (e.g. from about 0.05% to about 40% and preferably from about 3% to about 40%), by weight of the reaction mixture, of water, and an electrical conductivity enhancing amount of at least one electrolyte, the said electrical conductivity enhancing amount being suitably up to about 6% (e.g. from about 0.05% to about 6% and preferably from about 0.5% to about 6%), by weight of the reaction mixture.

According to a fourth aspect of the present invention there is provided the use of a bioadhesive composition in a biomedical skin electrode, said composition exhibiting water stability as defined herein and said composition being formed by polymerizing a homogeneous aqueous reaction mixture comprising at least one ionic water soluble monomer, at least one plasticiser (other than water), at least one non ionic water soluble monomer and at least one electrolyte.

When the hydrogels are intended for use in conjunction with Ag/AgCl medical electrodes, chloride ions are required to be present in order for the electrode to function. Potassium chloride and sodium chloride are commonly used. However any compound capable of donating chloride ions to the system may be used, for example, lithium chloride, calcium chloride, ammonium chloride. The amount that should be added is dependent on the electrical properties required and is typically about 1–7% by weight.

The main electrical property of interest is the impedance. Performance standards have been drawn up by the American Association of Medical Instruments (AAMI). In sensing electrode applications the electrodes, consisting of the adhesive and a suitable conductive support, are placed in pairs, adhesive to adhesive contact. The conductive support frequently has a Ag/AgCl coating in contact with the adhesive. The measured impedance is dependent on both the quality of the Ag/AgCl coating and the adhesive. In this configuration the adhesive must contain chloride ions. The concentration of chloride ions influences the impedance such that increasing the concentration can lower impedance. It would be anticipated that the activity of the ions (as opposed to the concentration) would be important in determining impedance, but in practice the determination of ion activity in these systems is not a trivial matter. In designing the hydrogel for lowest impedance as measured under the AAMI standard, allowance must be given for the amount and activity of water. These factors will control the effective ion activity and hence the amount of chloride available for participating in the electrochemistry of the system. Hydrogels with lower chloride concentration but higher water activity have lower impedances.

Greasy Skin Performance

The present invention further seeks to provide a bioadhesive composition that provides good adhesive performance when applied to naturally greasy skin or artificially grease-coated skin.

According to a fifth aspect of the present invention there is provided a bioadhesive composition formed by polymerizing a homogeneous aqueous reaction mixture comprising from about 5% to about 50%, by weight of the reaction mixture, of at least one ionic water soluble monomer, from about 10% to about 50%, by weight of the reaction mixture, of at least one plasticiser other than water), up to about 50% (e.g. from about 0.05% to about 50% and preferably from about 10% to about 50%), by weight of the reaction mixture, of at least one non ionic water soluble monomer, up to about 40% (e.g. from about 0.05% to about 40% and preferably from about 3% to about 40%), by weight of the reaction mixture, of water, up to about 10% (preferably from about 0.05% to about 9%, and most preferably less than 8%), by weight of the reaction mixture, of at least one surfactant and from about 1% to about 30%, by weight of the reaction mixture, of at least one hydrophobic monomer and/or polymer. In such a composition, the non ionic water soluble monomer typically serves as a reactive solvent bridge.

For the avoidance of doubt the term "polymer" used herein in relation to any polymers includes both homopolymers and copolymers. The term "polymerize" is understood accordingly.

The term "reactive solvent bridge" used herein refers to a partially lipophilic non ionic water soluble monomer which has the ability to partition between the hydrophobic and aqueous phases, whereby the hydrophobic monomer is substantially solubilised in the homogeneous reaction mixture before polymerization begins. The solvent bridge is reactive in that it is a polymerisable monomer which takes part in the polymerization reaction. Without wishing to be bound by theory, it is believed that the solvent bridge function of the non ionic water soluble monomer is exercised predominantly prior to, and in the relatively early stages of, the polymerization reaction, and reduces as the polymerization reaction proceeds.

Such compositions exhibit good adhesion to greasy skin. The hydrogels of the invention have been proven by the testing herein to provide adhesion of at least 0.35 N/cm on greasy skin of the type defined in the tests herein. No residue was left on the skin upon removal.

The invention provides a homogeneously dispersed reaction mixture comprising both hydrophobic and hydrophilic components which, on polymerization separates into a biphasic or a multiphasic structure. The phases have in some cases been observed to have a thickness of about 100 microns +/−50 microns. The reaction mixture contains one or more surface active agents which may assist or promote phase separation but in the course of polymerization become anistropically distributed between the resultant phases.

The presence of a hydrophobic monomer or polymer may be necessary in the initial homogenous dispersion in order to more effectively promote phase separation.

Surface Characteristics of the Polymerized Materials

It is a consequence of this invention that the phase separated polymerized material contains at least at its surface relatively hydrophobic regions, which enable the polymer to function as a pressure sensitive adhesive, and substantially hydrophilic regions, which enable the surface active agent to function in an aqueous environment at the interface between the polymer and mammalian skin. When the polymer is placed in contact with skin, the nature and quantity of surface active agent are chosen to bring about the removal of natural or synthetic hydrophobic material, such as skin lipid or skin crème, from the skin surface without adversely diminishing the work of adhesion between the hydrophobic domains and the skin surface. In as much as both the polymeric adhesive formed in this invention and the skin with which it is contacted are deformable under conditions of normal use, an equilibrium interfacial situation is reached in which some spatial exchange of hydrophobic regions and hydrophobic regions will take place on the skin surface.

The phase separated polymerized surface material is found to include predominantly well defined hydrophobic phases embedded in a hydrophilic matrix in which the water is predominantly contained. The hydrophobic phases are generally of elongated form, with a transverse dimension above the wavelength of light (e.g. about 0.5 to about 100 microns). They may therefore be visualized under a light microscope on a sample stained with a dye which binds preferentially to the hydrophobic phase.

The surface morphology of the elongate hydrophobic phases can vary widely. Without wishing to be bound by theory, it is believed that variations in the surface tension at the hydrophobic/hydrophilic interface as the polymerization reaction proceeds can cause the morphologies to vary in the final polymer. This surface tension can be affected by the nature and amount of both the reactive solvent bridge and the surfactant, and by other factors.

Thus, it is possible for the elongate hydrophobic phases at the surface of the polymerized material to congregate in a clustered, or alternatively a relatively open, arrangement. The hydrophobic phase visualized microscopically may, for example, appear as discontinuous linear and/or branched strands, or closed loops, embedded in the hydrophilic matrix. The polymerized material is typically non-bicontinuous. At least one of the hydrophobic and hydrophilic phases exists as discrete regions within the polymerized material, and both phases do not simultaneously extend across the polymerized material (bicontinuity).

According to a sixth aspect of the present invention there is provided a bioadhesive composition formed by providing a homogeneously dispersed reaction mixture comprising both hydrophobic and hydrophilic components and polymerizing said homogeneously dispersed reaction mixture such that on polymerization the reaction mixture separates into a biphasic or multiphasic structure at least at a surface of the bioadhesive composition.

According to a seventh aspect of the present invention there is provided the use of a bioadhesive composition in a biomedical skin electrode, said composition being formed by polymerizing a homogeneous aqueous reaction mixture comprising from about 5% to about 50%, by weight of the reaction mixture, of at least one ionic water soluble monomer, from about 10% to about 50%, by weight of the reaction mixture, of at least one plasticiser (other than water), up to about 50% (e.g. from about 0.05% to about 6% and preferably from about 0.05% to about 6%), by weight of the reaction mixture, of at least one non ionic water soluble monomer, up to about 40% (e.g. from about 0.05% to about 40% and preferably from about 3% to about 40%), by weight of the reaction mixture, of water, up to about 10% (preferably from about 0.05% to about 9% and most preferably less than 8%), by weight of the reaction mixture, of at least one surfactant, from about 1% to about 30%, by weight of the reaction mixture, of at least one hydrophobic monomer and/or polymer, and an electrical conductivity enhancing amount of at least one electrolyte, the said electrical conductivity enhancing amount being suitably up to about 6% (e.g. from about 0.05% to about 6% and preferably from about 0.5% to about 6%), by weight of the reaction mixture.

According to an eighth aspect of the present invention there is provided the use of a bioadhesive composition in a biomedical skin electrode, the bioadhesive composition being formed by providing a homogeneously dispersed reaction mixture comprising both hydrophobic and hydrophilic components and polymerizing said homogeneously dispersed reaction mixture such than on polymerization the reaction mixture separates into a biphasic or multiphasic structure at least at a surface of the bioadhesive composition.

The preferred features of the first, second, third and fourth aspects of the invention as hereinbefore described apply equally to the fifth, sixth, seventh and eighth aspects of the invention.

Surfactant

Any compatible surfactant may be used. Non ionic, anionic and cationic surfactants are preferred. The surfactant ideally comprises any of the surfactants listed below either alone or in combination with other surfactants.

1. Non ionic Surfactants

Suitable non ionic surfactants include but are not limited to those selected from the group consisting of the condensation products of a higher aliphatic alcohol, such as a fatty alcohol, containing about 8 to about 20 carbon atoms, in a straight or branched chain configuration, condensed with about 3 to about 100 moles, preferably about 5 to about 40 moles and most preferably about 5 to about 20 moles of ethylene oxide. Examples of such non ionic ethoxylated fatty alcohol surfactants are the Tergitol.TM. 15-S series from Union. Carbide and Brij.TM. surfactants from ICI. Tergitol.TM. 15-S surfactants include $C_{11}$–$C_{15}$ secondary alcohol polyethyleneglycol ethers. Brij.TM 58 surfactant is polyoxyethylene(20) cetyl ether, and Brij.TM. 76 surfactant is polyoxyethylene(10) stearyl ether.

Other suitable non ionic surfactants include but are not limited to those selected from the group consisting of the polyethylene oxide condensates of one mole of alkyl phenol containing from about 6 to 12 carbon atoms in a straight or branched chain configuration, with about 3 to about 100 moles of ethylene oxide. Examples of non ionic surfactants are the Igepal.TM. CO and CA series from Rhone-Poulenc. Igepal.TM. CO surfactants include nonylphenoxy poly (ethyleneoxy) ethanols. Igepal.TM. CA surfactants include octylphenoxy poly(ethyloneoxy) ethanols.

Another group of usable non ionic surfactants include but are not limited to those selected from the group consisting of block copolymers of ethylene oxide and propylene oxide or butylene oxide.

Examples of such non ionic block copolymer surfactants are the Pluronic.TM. And Tetronic.TM Series of surfactants from BASF. Pluronic.TM. surfactants include ethylene oxide-propylene oxide block copolymers. Tetronic.TM. surfactants include ethylene oxide-propylene oxide block copolymers. The balance of hydrophobic and hydrophilic components within the surfactant together with the molecular weight are found to be important. Suitable examples are Pluronic L68 and Tetronic 1907. Particularly suitable examples are Pluronic L64 and Tetronic 1107. Still other satisfactory non ionic surfactants include but are not limited to those selected from the group consisting of sorbitan fatty acid esters, polyoxyethylene sorbitan fatty acid esters and polyoxyethylene stearates. Examples of such fatty acid ester non ionic surfactants are the Span.TM., Tween.TM., and Myrj.TM. surfactants from ICI. Span.TM. surfactants include $C_{12}$–$C_{18}$ sorbitan monoesters. Tween.TM. surfactants include poly(ethylene oxide) $C_{12}$–$C_{18}$ sorbitan monoesters. Myrj.TM. surfactants include poly(ethylene oxide) stearates.

2. Anionic Surfactants

Anionic surfactants normally include a hydrophobic moiety selected from the group consisting of (about $C_6$ to about $C_{20}$) alkyl, alkylaryl, and alkenyl groups and an anionic group selected from the group consisting of sulfate, sulfonate, phosphate, polyoxyethylene sulfate, polyoxyethylene sulfonate, polyoxyethylene phosphate and the alkali metal salts, ammonium salts, and tertiary amino salts of such anionic groups.

Anionic surfactants which can be used in the present invention include but are not limited to those selected from the group consisting of (about $C_6$ to about $C_{20}$) alkyl or alkylaryl sulfates or sulfonates such as sodium lauryl sulfate (commercially available as Polystep.TM B-3 from Srepan Co.) and sodium dodecyl benzene sulfonate, (commercially available as Siponate.TM.DS-10 from Rhone-Poulene); polyoxyethylene (about $C_6$ to about $C_{20}$) alkyl or alkylphenol ether sulfates with the ethylene oxide repeating unit in the surfactant below about 30 units, preferably below about 20 units, most preferably below about 15 units, such as Polystep.TM.B-1 commercially available from Stepan Co. and Alipal.TM. EP110 and 115 from Rhone-Poulenc; (about $C_6$ to about $C_{20}$) alkyl or alkylphenoxy poly (ethyleneoxy)ethyl mono-esters and di-esters of phosphoric acid and its salts, with the ethylene oxide repeating unit in the surfactant below about 30 units, preferably below about 20 units, most preferably below about 15 units, such as Gafac.TM. RE-510 and Gafac.TM. RE-610 from GAF.

3. Cationic Surfactants

Cationic surfactants useful in the present invention include but are not limited to those selected from the group consisting of quaternary ammonium salts in which at least one higher molecular weight group and two or three lower molecular weight groups are linked to a common nitrogen atom to produce a cation, and wherein the electrically-balancing anion is selected from the group consisting of a halide (bromide, chloride, etc.), acetate, nitrite, and lower alkosulfate (methosulfate etc.). The higher molecular weight substituent(s) on the nitrogen is/are often (a) higher alkyl group(s), containing about 10 to about 20 carbon atoms, and the lower molecular weight substituents may be lower alkyl of about 1 to about 4 carbon atoms, such as methyl or ethyl, which may be substituted, as with hydroxy, in some instances. One or more of the substituents may include an aryl moiety or may be replaced by an aryl, such as benzyl or phenyl.

In a particularly preferred embodiment of the invention the surfactant comprises at least one propylene oxide/ethylene oxide block copolymer, for example such as that supplied by BASF Plc under the trade name Pluronic L64. The reaction mixture ideally comprises from 0.1% to 5%, by weight of the reaction mixture, of surfactant.

The surfactant acts to remove the grease from the skin and to form the removed grease into isolated pockets within the hydrogel without reducing the work of adhesion of the coating.

Lipid-micellising Polymer

In a preferred embodiment of the invention the homogeneously dispersed reaction mixture preferably further comprises from about 0.1% to about 5% by weight of the reaction mixture of a lipid-micellising polymer, i.e. a so-called hypercoiling polymer. This polymer functions to micellise and remove the rolled up pockets of grease from the gel-skin interface.

This hypercoiling polymer has the capability of more effectively solvating the primary surfactant micelles that contact hydrophobic skin contaminant such as skin lipid or skin crème. The consequence of this functional role is that the work of adhesion between adhesive and skin is progressively less affected by the presence of either or both surfactant or hydrophobic skin contaminant.

The hypercoiling polymer preferably comprises any of the following either alone or in combination: poly (maleic acid-styrene), poly (maleic acid-butyl vinyl ether), poly (maleic acid-propyl vinyl ether), poly (maleic acid-ethyl vinyl ether) and poly (acrylic acid-ethyl acrylate).

A particularly preferred example is an alternating copolymer of styrene and maleic acid. As stated previously the composition of the invention seeks to provide a biphasic structure on polymerization. These two phases are hydrophilic and hydrophobic. The hydrophobic phase may be provided by a hydrophobic monomer which is initially maintained as part of the homogenous reaction mixture by way of a reactive solvent bridge as discussed hereinafter. Alternatively and/or additionally the hydrophobic component is provided as a polymer which separates from the aqueous phase on polymerization.

Hydrophobic Monomer

The reaction mixture preferably comprises from about 1% to about 15%, by weight of the reaction mixture, of a hydrophobic non-water soluble monomer. This hydrophobic monomer ideally comprises any of the following either alone or in combination: n-butyl acrylate, n-butyl methacrylate, a hexyl acrylate, iso octyl acrylate, isodecyl acrylate, ethoxyethyl acrylate tehra-hydrofurfuryl acrylate, vinyl propionate and vinyl butyrate. Particularly preferred are ethoxy ethyl acrylate or butyl acrylate. When the hydrogel comprises a hydrophobic component, such as butyl acrylate as well as a hydrophilic monomer (i.e. the aforesaid water soluble ionic monomer), such as NaAMPS, the aforesaid non ionic water soluble monomer, in the preferred example NNDMA, acts as the so-called "reactive solvent bridge" to provide intimate mixing of the various seemingly incompatible components of the reaction mixture prior to polymerization. The reaction mixture thus has a homogenous structure containing both hydrophilic and hydrophobic components that are intimately mixed, as the NNDMA acts as a solvent for both hydrophilic and hydrophobic materials, providing a clear compatible coating solution or dispersion. As the reactive solvent bridge is polymerized and thus essentially removed from the reaction mixture the stability of the system is adversely affected and the compatible coating solutions or dispersions undergo phase separation so as to provide a biphasic structure.

In certain circumstances the reaction mixture preferably comprises from about 3% to about 20%, and more preferably from about 8% to about 18%, by weight of the reaction mixture, of a stabilized hydrophobic polymer dispersion that is used to provide a stable phase separated system. The hydrophobic polymer preferably comprises any of the following either alone or in combination: vinylacetate dioctyl maleate copolymer or ethylene-vinyl acetate copolymer. Ethylene-vinyl acetate copolymer is preferred, such as that marketed under the trade name DM137 by Harco Chemicals.

Polymerization Conditions

In preparing bioadhesive compositions in accordance with the invention, the ingredients will usually be mixed to provide a reaction mixture in the form of an initial pre-gel aqueous based liquid formulation, and this is then converted into a gel by a free radical polymerization reaction. This may be achieved for example using conventional thermal initiators and/or photoinitiators or by ionizing radiation. Photoinitiation is a preferred method and will usually be applied by subjecting the pre-gel reaction mixture containing an appropriate photoinitiation agent to UV light after it has been spread or coated as a layer on siliconised release paper or other solid substrate. The incident UV intensity, at a wavelength in the range from 240 to 420 nm, is ideally substantially 40 mW/cm$^2$. The processing will generally be carried out in a controlled manner involving a precise predetermined sequence of mixing and thermal treatment or history.

The UV irradiation time scale should ideally be less than 60 seconds, and preferably less than 10 seconds to form a gel with better than 95% conversion of the monomers and for conversion better than 99.95% exposure to UV light less than 60 seconds and preferably less than 40 seconds is preferred. Those skilled in the art will appreciate that the extent of irradiation will be dependent on the thickness of the reaction mixture, concentration of photoinitiator and nature of substrate onto which the reaction mixture is coated and the source of UV.

These timings are for medium pressure mercury arc lamps as the source of UV operating at 100 W/cm. The intensity of UV between 240 nm and 420 nm reaching the surface of the substrate is at least 200 mW/cm$^2$ as measured on a Solascope from Solatell. For a given lamp, UV intensity is a function of the operating power and distance of the reaction mixture from the UV source.

It is noted that although the adhesives of this invention are normally prepared as sheets, coatings or laminates, other and non limiting forms of preparation include fibres, strands pellets or particles. Particular bioadhesives, for example may find application in buccal or gastrointestinal drug delivery systems.

EXAMPLES OF THE INVENTION

The invention will be further described with reference to the formulations hereinafter.

All formulations detailed below were coated onto polyurethane foam (EV1700X from Caligen) at a coat weight of 0.8 to 1.6 kg per square meter and cured by exposure to ultraviolet radiation emitted from a medium pressure mercury arc lamp operating at 100 W/cm power for 10 seconds.

Example 1

Mix 6.0 g of Irgacure 184 with 20 g IRR280(PEG400 diacrylate) from UCB (Solution A). To 0.07 g of Irgacure 184 add 23.5 g of NNDMA and stir for one hour (keep container covered from light). Add 30 g of glycerol to this and stir for 5 minutes, followed by 40 g of NaAMPS (58%). Stir for another 5 minutes. Add 0.13 g of solution A and stir the whole formulation for 1 hour before use.

Example 2

Mix 6.0 g of Irgacure 184 with 20 g IRR280 (PEG400 diacrylate) from UCB (Solution A). To 0.07 g of Irgacure 184 add 23.5 g of NNDMA and stir for one hour (keep container covered from light). Add to this 10 g of Mowilith DM137 (50% dispersion of ethylene vinyl acetate copolymer in water from Harco) and stir for 5 minutes. Add 30 g of glycerol to this and stir for 5 minutes, followed by 40 g of NaAMPS (58%). Stir for another 5 minutes. Add 0.13 g of solution A and stir the whole formulation for 1 hour before use.

Example 3

Mix 6.0 g of Irgacure 184 with 20 g IRR280(PEG400 diacrylate) from UCB (Solution A). To 0.07 g of Irgacure 184 add 23.5 g of NNDMA and stir for one hour (keep container covered from light) Add to this 10 g of Mowilith DM137 (50% dispersion of ethylene vinyl acetate copolymer in water from Harco) and stir for 5 minutes. Add 30 g of glycerol to this and stir for 5 minutes, followed by 40 g of NaAMPS (58%). Stir for another 5 minutes. Add 0.5 g of Pluronic L64 (poly(ethylene glycol)-block-poly(propylene glycol)-block-poly(ethylene glycol) available from BASF).

Add 0.13 g of solution A and stir the whole formulation for 1 hour before use.

Example 4

Mix 6.0 g of Irgacure 184 with 20 g IRR280(PEG400 diacrylate) from UCB (Solution A). To 0.07 g of Irgacure 184 add 23.4 g of NNDMA and stir for one hour (keep container covered from light). Add to this 2 g of Mowilith DM137 (50% dispersion of ethylene vinyl acetate copolymer in water from Harco) and stir for 5 minutes. Add 36 g of glycerol to this and stir for 5 minutes, followed by 40.36 g of NaAMPS (58%). Stir for another five minutes. Add 0.25 g of Pluronic L64 (poly(ethylene glycol)-block-poly (propylene glycol)-block-poly(ethylene glycol) available from BASF). To this add 0.8 g of a 30% aqueous solution of poly(styrene-alt-maleic acid) sodium salt available from Aldrich and stir for 10 minutes. Add 0.13 g of solution A and stir the whole formulation for 1 hour before use.

Example 5

Mix 6.0 g of Irgacure 184 with 20 g IRR280(PEG400 diacrylate) from UCB (Solution A). To 0.07 g of Irgacure 184 add 23.4 g of NNDMA and stir for one hour (keep container covered from light). Add to this 10 g of Mowilith DM137 (50% dispersion of ethylene vinyl acetate copolymer in water from Harco) and stir for 5 minutes. Add 36 g of glycerol to this and stir for 5 minutes, followed by 40.36 g of NaAMPS (58%). Stir for another 5 minutes. Add 0.25 g of Pluronic L64 (poly(ethylene glycol)-block-poly (propylene glycol)-block-poly(ethylene glycol) available from BASF). To this add 0.8 g of a 30% aqueous solution of poly(styrene-alt-maleic acid) sodium salt available from Aldrich and stir for 10 minutes. Add 0.13 g of solution A and stir the whole formulation for 1 hour before use.

Example 6

Mix 6.0 g of Irgacure 184 with 20 g IRR280(PEG400 diacrylate) from UCB (Solution A). To 0.07 g of Irgacure 184 add 23.4 g of NNDMA and stir for one hour (keep container covered from light). Add to this 10. g of Mowilith DM137 (50% dispersion of ethylene vinyl acetate copolymer in water from Harco) and stir for 5 minutes. Add 36 g of glycerol to this and stir for 5 minutes, followed by 40.36 g of NaAMPS (58%). Stir for another 5 minutes. Add 0.5 g of Pluronic L64 (poly(ethylene glycol)-block-poly (propylene glycol)-block-poly(ethylene glycol) available from BASF). To this add 0.8 g of a 30% aqueous solution of poly(styrene-alt-maleic acid) sodium salt available from Aldrich and stir for 10 minutes. Add 0.13 g of solution A and stir the whole formulation for 1 hour before use. Optical phase contrast microscopy showed the resultant gel to have a regularly phase-segregate surface (see FIG. 1 and the associated discussion below).

Example 7

Mix 6.0 g of Irgacure 184 with 20 g IRR280(PEG400 diacrylate) from UCB (Solution A). To 0.07 g of Irgacure 184 add 23.4 g of NNDMA and stir for one hour (keep container covered from light). Add to this 20 g of Mowilith DM137 (50% dispersion of ethylene vinyl acetate copolymer in water from Harco) and stir for 5 minutes. Add 36 g of glycerol to this and stir for 5 minutes, followed by 40.36 g of NaAMPS (58%). Stir for another 5 minutes. Add 0.5 g of Pluronic L64 (poly(ethylene glycol)-block-poly (propylene glycol)-block-poly(ethylene glycol) available from BASF). To this add 0.8 g of a 30% aqueous solution of poly(styrene-alt-maleic acid) sodium salt available from Aldrich and stir for 10 minutes. Add 0.13 g of solution A and stir the whole formulation for 1 hour before use.

Example 8

To 36 parts glycerol, were added 0.5 parts of a 30% aqueous solution of poly(styrene-alt-maleic acid) sodium salt available from Aldrich and 40.4 parts of a 58% solution of the sodium salt of 2-acrylamido-2-methylpropane sulphonic acid (NaAMPS) (LZ2405A) together with 0.5 parts Pluronic LF64 (BASF), and the solution stirred to ensure uniform mixing. To the solution was added 0.13 parts of solution containing 20 parts of polyethylene glycol diacrylate (PEG600) (product of UCB Chemicals marketed under the trade name designation of Ebacryl 11) in which 6 parts of 1-hydroxycyclohexyl phenyl ketone (product of Ciba and marketed under the trade name designation of Irgacure 184) had been dissolved. A premixed solution of 8 parts butyl acrylate and 15.7 parts N,N-dimethylacrylamide (Kohjin) was added to that reaction mixture and this final solution cured by exposure to UV light as in example 1. Optical phase contrast microscopy showed the resultant gel to have a regularly phase-segregated surface and enhanced adhesion to skin that had previously treated with skin cream (Nivea) (see FIG. 2 and the associated discussion below).

Example 9

To 30 parts glycerol, were added 0.5 parts of a 30% aqueous solution of poly(styrene-alt-maleic acid) sodium salt available from Aldrich and 40 parts of a 58% solution of the sodium salt of 2-acrylamido-2methylpropane sulphonic acid (NaAMPS) (LZ2405A) together with 0.5 parts Pluronic P65 (BASF), and the solution stirred to ensure uniform mixing. To the solution was added 0.13 parts of solution containing 20 parts of polyethylene glycol diacrylate (PEG600) (product of UCB Chemicals marketed under the trade name Ebacryl 11) in which 6 parts of 1-hydroxycyclohexyl phenyl ketone product of Ciba and marketed under the trade name designation of Irgacure 184) had been dissolved. A premixed solution of 6 parts ethoxyethyl acrylate and 18 parts N,N-dimethylacrylamide (Kohjin) was added to that reaction mixture and this final solution cured by exposure to UV light as in example 1. Optical microscopy showed the resultant gel to have a regularly phase-segregated surface (see FIG. 3 and the associated discussion below).

Microscopy

The gels of Examples 6, 8 and 9 were examined using a Leitz Dialux 20 microscope with a "Wild MPS photoautomat" camera attachment. The microscope was equipped with a 12.5× eyepiece. The image can then be magnified by a number of objectives of which the ×4, ×10 (phaco) and ×25 (phaco) were most commonly used. Both phase contrast and brightfield illumination were used.

Staining

The sample of Example 9 was stained prior to microscopy. A saturated solution of Bromopyrogallol Red in methanol was used to differentially stain the hydrophobic areas of the hydrogel surface. The solution is applied to the surface of the sample, which is then rinsed with methanol to remove any excess dye solution and dye solid. The criteria used in dye selection are outlined below.

The choice of a dye to differentially stain the more hydrophobic and more hydrophilic regions of these gels is influenced by many factors, this may be illustrated by a comparison of Bromopyrogallol Red and fluorescein sodium which are taken up or retained to different extents in different polymer types. The two major factors are charge and hydrophobicity. Bromopyrogallol Red is dominated by acidic —$SO_3H$ and —COOH groups and fluorescein sodium by a slightly acidic —COOH group. More basic regions of the polymer have most affinity for the acidic dye and the acidic regions least affinity for the acidic dye. It can also be observed that a higher water content material allows more rapid uptake of a dye. In conventional hydrogels this is influenced by the fact that higher water content materials will often contain the slightly basic N-vinyl pyrrolidone or N,N-dimethylacrylamide groups which attracts dyes containing acidic groups, e.g. —$SO_3H$ and COOH.

As well as acidity and basicity of the dyes and the polymers, the partition coefficients of the dyes also have a marked effect on the retention of the dyes within the materials. This property is conventionally and commonly characterized by measuring the partition coefficient of the dye between octanol and water ($K_{ow}$). Bromopyrogallol Red has a log $K_{ow}$ of −0.49 and fluorescein sodium has a log $K_{ow}$ of −0.98. Both of the dyes are able to partition between the aqueous and non-aqueous components of the polymers used. However, Bromopyrogallol Red is more likely to favor the more hydrophobic than the more hydrophilic aqueous phase, in comparison to fluorescein sodium which would prefer the aqueous environment. This preference is illustrated by the fact that conventional N-vinyl pyrrolidone or N,N-dimethylacrylamide based hydrogels tend to retain approximately 30% of the Brompyrogallol Red dye within the polymeric network.

The more intense color of Brompyrogallol Red coupled with its greater affinity for hydrophobic domains and its solubility in methanol make it much more suited than sodium fluorescein for indicating by differential staining the presence of hydrophobic and hydrophilic regions in the surface of polymer gels.

Results

Figure 1:
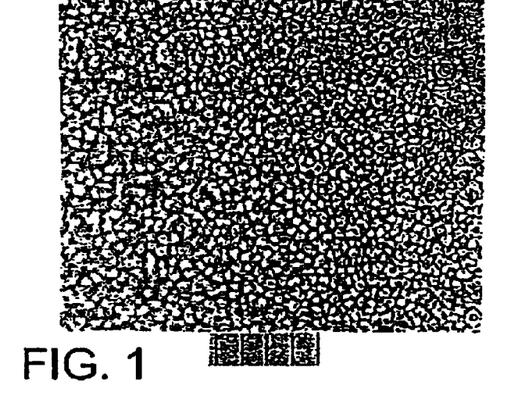
FIG. 1 shows surface morphology of the product of Example 6, visualised under phase contrast (one scale division=50 microns)
Figure 2:
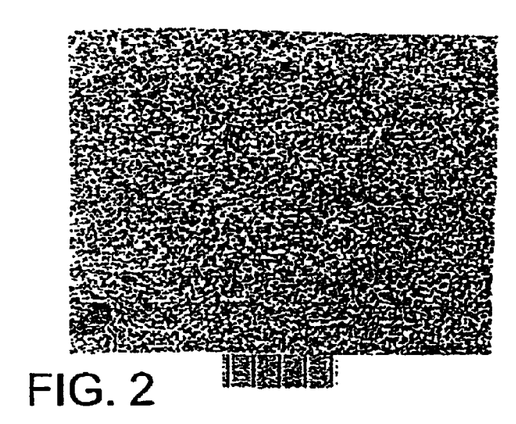
FIG. 2 shows surface morphology of the product of Example 8, visualised under phase contrast (one scale division=50 microns)
Figure 3:
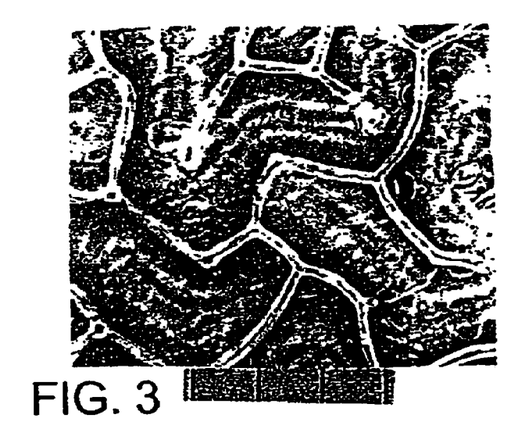
FIG. 3 shows surface morphology of the product of Example 9, visualised under staining with brightfield illumination (one scale division=50 microns).

The photomicrographs obtained from inspection of the surface morphology of the polymerised product of Examples 6, 8 and 9 are shown in accompanying FIGS. 1, 2 and 3 respectively.

FIG. 1 shows surface morphology of the product of Example 6, visualised under phase contrast (one scale division=50 microns);

FIG. 2 shows surface morphology of the product of Example 8, visualised under phase contrast (one scale division=50 microns);

FIG. 3 shows surface morphology of the product of Example 9, visualised under staining with brightfield illumination (one scale division=50 microns).

In FIG. 1, the hydrophobic phase appears as a relatively clustered arrangement of closed loops overlying the hydrophilic matrix.

In FIG. 2, the hydrophobic phase appears as a relatively clustered arrangement of linear and branched strands, overlying the hydrophilic matrix.

In FIG. 3, the hydrophobic phase appears as a relatively open arrangement of branched strands, overlying the hydrophilic matrix, with clear evidence of phase separation both within the stranded network and as between the hydrophilic matrix and the overlying stranded network.

TABLE 1

Effect of water uptake on peel adhesion on dry skin, for the formulation in Example 1.

| % Water uptake | Peel Adhesion (N/cm) |
|---|---|
| Subject 1 | |
| 0 | 1.8 |
| 9 | 2.2 |
| 10 | 2.3 |
| 24 | 1.6 |
| Subject 2 | |
| 0 | 1.6 |
| 9 | 2.9 |
| 11 | 2.5 |
| 12 | 2.6 |

TABLE 2

Effect on peel adhesion on dry skin, from the addition of phase separator to the formulation in Example 1
Peel Strength (N/cm)

| | Example 1 | Example 2 |
|---|---|---|
| Subject 1 | 1.8 | 2.9 |
| Subject 2 | 1.6 | 3.2 |

TABLE 3

Effect of the addition of surfactant to the formulation, in Example, 2 on dry and greasy skin.
Peel Strength (N/cm)

| | | Greasy Skin | |
|---|---|---|---|
| | Dry | 1 min | 10 min |
| Subject 1 | 2.8 | 0.52 | 0.33 |
| Subject 2 | 2.5 | 0.67 | 0.61 |

TABLE 4

Peel strength on dry and greasy skin, for Examples 4, 5, 6 & 7
Peel Strength (N/cm)

| | Subject 1 | | | Subject 2 | | |
|---|---|---|---|---|---|---|
| | | Greasy | | | Greasy | |
| Example | Dry | 1 min | 10 min | Dry | 1 min | 10 min |
| 4 | 0.81 | 0.15 | 0.26 | 0.96 | 0.29 | 0.47 |
| 5 | 1.2 | 0.52 | 0.69 | 2.2 | 0.83 | 0.88 |
| 6 | 1.6 | 0.45 | 0.6 | 2.2 | 0.64 | 0.56 |
| 7 | 1.2 | 0.49 | 0.62 | 1.6 | 0.74 | 0.88 |

Peel Adhesion Method

This is a method to determine the peel strength required of adhered hydrogel to the skin of two male subjects of different ethnic origin. The skin is tested "dry" (i.e. normal to the subject) and greasy as described next.

Equipment

| Scissors | Convenient source |
|---|---|
| Standard ruler | Convenient source |
| Compression weight | 5.0 kg, diameter 130 mm |

-continued

| | |
|---|---|
| Polyester Film | PET 23μ available from EFFEGIDI S.p.A.43052 Colomo, Italy |
| Transfer Adhesive | 3M 1524 available from 3M Italia S.p.A. 20090 Segrate, Italy |
| Stop Watch | Convenient source |
| Tensile Tester | Instron mod: 6021 (or equivalent) |

Test Procedure
A) Tensile Tester Peel Settings:

| | |
|---|---|
| Load cell | 10 N |
| Test Speed | 1000 mm/min |
| Clamp to Clamp Distance | 25 mm |
| Pre Loading | 0.2 N |
| Test Path "LM" | 50 mm |
| Measure variable | F average (N) in "LM" |

B) Sample Preparation

Allow the samples to adjust to conditioned room (23±2° Celsius and 50±2% RH) for about 1 hour.

2. Each test specimen should be prepared individually and tested immediately.

3. Prepare rectangular adhesive samples 100 mm ±2 length and 25.4 mm width.

On the forearm draw a rectangle about 2 cm wider and longer of the area of the glue extrusion. Ring one cotton disk (i.e. Demak up diameters 5.5 cm, weight about 0.6 g) put on its 4 drops (about 0.20 g) of cream "Nivea body" (for normal skin) folding the cotton disk twice in order so that the cotton absorbs the cream and with a light pressure rub the forearm surface with the treated cotton side three times.

Attach adhesive specimen to the forearm within marked area with light pressure.

Gently roll the compression weight down the forearm, on the adhesion sample.

Remove the weight and test after 1 and 10 minutes by attaching one end of the specimen into the upper jaws of an adhesion testing machine at an initial angle of 90°.

The same procedure as above is carried out in order to determine the peel strength of the adhesive after absorption of water. The specimen is placed into an oven at 37° C. and at 85% humidity. The time of exposure is dependent on the degree of water uptake required. The sample is then removed from the oven and the steps 5 to 7 are carried out.

Although certain examples of apparatus constructed in accordance with the teachings of the invention have been described herein, the scope of coverage of this patent is not limited thereto. On the contrary, this patent covers all embodiments falling within the scope of the appended claims either literally or under the doctrine of equivalents.

What is claimed is:

1. A bioadhesive composition formed by polymerising a homogeneous aqueous reaction mixture comprising from about 5% to about 50%, by weight of the reaction mixture, of at least one ionic water soluble monomer, from about 10% to about 50%, by weight of the reaction mixture, of at least one plasticiser which is not water, up to about 50%, by weight of the reaction mixture, of at least one non ionic water soluble monomer, up to about 40%, by weight of the reaction mixture, of water, up to about 10%, by weight of the reaction mixture, of at least one surfactant and from about 1% to about 30%, by weight of the reaction mixture, of at least one hydrophobic monomer and/or polymer, said composition comprising a polymerised material having a hydrophobic phase and a hydrophilic phase, wherein at least one of said hydrophobic and hydrophilic phases exists as discrete regions within said polymerised material and both phases do not simultaneously extend across the polymerised material.

2. A bioadhesive composition as claimed in claim 1, characterised in that the composition provides adhesion of at least 0.35 N/cm on greasy skin of the type defined in tests herein.

3. A bioadhesive composition as claimed in claim 1, characterised in that the composition provides adhesion on dry skin at no less than 0.5 N/cm.

4. A bioadhesive composition as claimed in claim 1, characterised in that said ionic monomer comprises an acrylate based monomer.

5. A bioadhesive composition as claimed in claim 1, characterised in that said ionic monomer comprises any of 2-acrylamido-2-methylpropane sulphonic acid, an analogue thereof or a salt thereof.

6. A bioadhesive composition as claimed in claim 1, characterised in that the reaction mixture comprises from about 30% to about 50%, by weight of the reaction mixture, of said ionic monomer.

7. A bioadhesive composition as claimed in claim 1, characterised in that said plasticiser comprises any of the following either alone or in combination: at least one polyhydric alcohol, at least one ester derived from polyhydric alcohol and at least one polymeric alcohol.

8. A bioadhesive composition as claimed in claim 1, characterised in that said plasticiser comprises at least one of glycerol and an ester derived from boric acid and glycerol.

9. A bioadhesive composition as claimed in claim 1, characterised in that the bioadhesive composition comprises from about 15% to about 45%, by weight of the reaction mixture of said plasticiser which is not water.

10. A bioadhesive composition as claimed in claim 1, characterised in that the non ionic water soluble monomer comprises at least one of a mono- or dialkylacrylamide or an analogue thereof.

11. A bioadhesive composition as claimed in claim 1, characterised in that said non ionic water soluble monomer comprises at least one of N,N-dimethylacrylamide or an analogue thereof.

12. A bioadhesive composition as claimed in claim 1, characterised in that the reaction mixture comprises from about 15% to about 25%, by weight of the reaction mixture, of said non ionic water soluble monomer.

13. A bioadhesive composition as claimed in claim 1, characterised in that the reaction mixture comprises from about 0.1% to about 5%, by weight of the reaction mixture, of said surfactant.

14. A bioadhesive composition as claimed in claim 1, characterised in that said surfactant comprises one or more non ionic surfactants.

15. A bioadhesive composition as claimed in claim 1, characterised in that the surfactant comprises one or more anionic surfactants.

16. A bioadhesive composition as claimed in claim 1, characterised in that the surfactant comprises one or more cationic surfactants.

17. A bioadhesive composition as claimed in claim 1, characterised in that the surfactant comprises at least one propylene oxide/ethylene oxide block copolymer.

18. A bioadhesive composition as claimed in claim 1, characterised in that the reaction mixture further comprises at least one lipid micellising polymer.

19. A bioadhesive composition as claimed in claim 18, characterised in that the reaction mixture comprises from about 0.1% to about 5%, by weight of the reaction mixture, of lipid micellising polymer.

20. A bioadhesive composition as claimed in claim 18, characterised in that the lipid micellising polymer comprises any of the following either alone or in combination: poly (maleic acid-styrene), poly (maleic acid-butyl vinyl ether), poly (maleic acid-propyl vinyl ether), poly (maleic acid-ethyl vinyl ether) and poly (acrylic acid-ethyl acrylate).

21. A bioadhesive composition as claimed in claim 18, characterised in that the lipid micellising polymer comprises an alternating copolymer of styrene and maleic acid.

22. A bioadhesive composition as claimed in claim 18, characterized in that the reaction mixture comprises from about 1% to about 15%, by weight of the reaction mixture, of said hydrophobic monomer.

23. A bioadhesive composition as claimed in claim 18, characterised in that said hydrophobic monomer comprises any of the following either alone or in combination: nbutyl acrylate, n-butyl methacrylate, a hexyl acrylate, iso-octyl acrylate, isodecyl acrylate, ethoxyethyl acrylate tehrahydrofurfuryl acrylate, vinyl propionate, and vinyl butyrate.

24. A bioadhesive composition as claimed in claim 18, characterized in that the hydrophobic monomer comprises at least one of ethoxy ethyl acrylate or butyl acrylate.

25. A bioadhesive composition as claimed in claim 18, characterised in that the reaction mixture comprises about 3% to about 20%, by weight of the reaction mixture, of said hydrophobic polymer.

26. A bioadhesive composition as claimed in claim 18, characterised in that the said hydrophobic polymer comprises any of the following either alone or in combination:
vinylacetate dioctyl maleate copolymer or ethylene vinylacetate copolymer.

27. A biomedical skin electrode comprising a skin contactable bioadhesive, the skin contactable bioadhesive comprising a composition of claim 1.

28. A wound dressing comprising a skin contactable bioadhesive, the skin contactable bioadhesive comprising a composition of claim 1.

* * * * *